United States Patent [19]
Benson et al.

[11] Patent Number: 4,964,233
[45] Date of Patent: Oct. 23, 1990

[54] FISHING SIGNAL DEVICE

[76] Inventors: James A. Benson, 469 W. State St., Sharon, Pa. 16146; James M. Benson, 8017 Sharon-Warren Rd., Masury, Ohio 44438

[21] Appl. No.: 473,473
[22] Filed: Feb. 1, 1990
[51] Int. Cl.⁵ .............................................. A01K 97/12
[52] U.S. Cl. ......................................... 43/17; 43/21.2
[58] Field of Search .................................. 43/17, 21.2

[56] References Cited
U.S. PATENT DOCUMENTS

| | | | |
|---|---|---|---|
| 2,948,076 | 8/1960 | Patricello | 43/17 |
| 3,283,437 | 11/1966 | Galarneau . | |
| 3,371,443 | 3/1968 | Dobson . | |
| 3,559,327 | 2/1971 | Christopher | 43/17 |
| 3,646,698 | 3/1972 | Zachal | 43/17 |
| 3,835,568 | 9/1974 | Whitfield . | |
| 4,471,554 | 9/1984 | Heiskell | 43/21.2 |
| 4,517,760 | 5/1985 | Randle | 43/21.2 |
| 4,746,253 | 5/1988 | Simmone | 43/17 |

Primary Examiner—Richard K. Seidel
Assistant Examiner—James Miner
Attorney, Agent, or Firm—Harpman & Harpman

[57] ABSTRACT

A fishing signal and rod holder for positioning and holding fishing rods and reels for unattended fishing that signals the fisherman when a fish strikes the line. The rod holder includes a fixed angular inclined rod receptacle adjacent a signaling device to which the fishing line engages. The signaling device releases the fishing line during a strike and falls forward engaging a stop defining a sound signal.

5 Claims, 1 Drawing Sheet

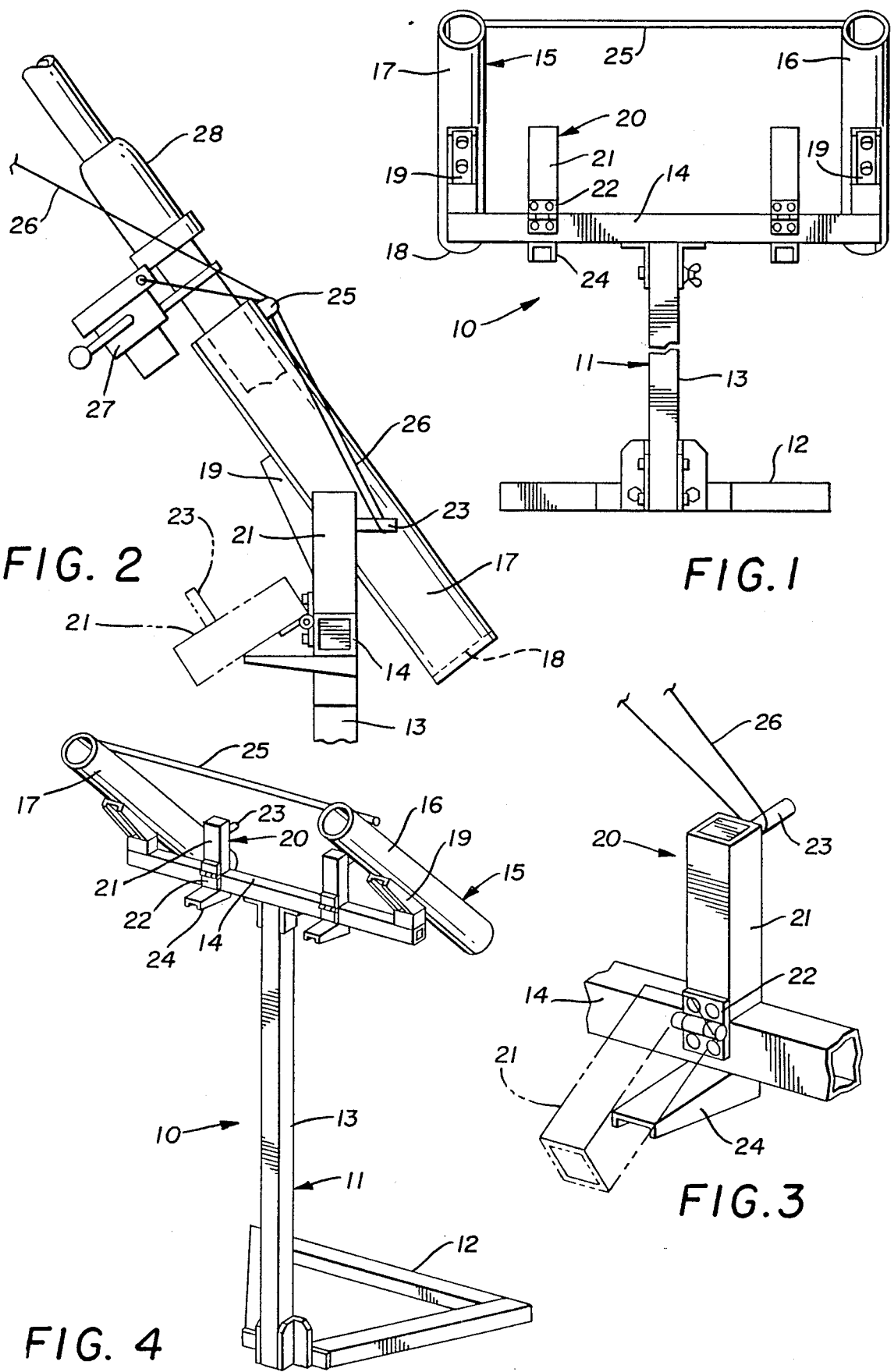

FISHING SIGNAL DEVICE

BACKGROUND OF THE INVENTION

1. Technical Field

This device relates to fishing alarms to signal a fisherman that his line has been hit. This device is used with unattended fishing rod and reel holders so that the user will not have to constantly monitor the fishing line.

2. Description of Prior Art

Prior Art devices of this type have relied on a variety of different holders and signaling configurations both mechanical and electrical, see for example U.S. Pat. Nos. 3,835,568, 3,371,443 and 3,283,437.

In U.S. Pat. Ser. No. 3,835,568 a fishing rod and reel assembly is disclosed that uses a wire bracket to hold the rod and reel with the fishing line engaged around a switch lever interconnected to a power source and both an audio and visual alarm system. When a fish strikes the switch arm is moved activating the audio visual alarms.

In U.S. Pat. No. 3,371,443 a signaling device is shown wherein a rod and reel holder is secured into the ground and a signaling flag assembly is secured thereto. The signaling flag assembly has a pivoted flag arm with a flag held in horizontal position by a latch arm connected to the fishing line. When a fish strikes the latch arm is pulled up disengaging the flag arm which then falls downwardly to a vertically disposed position adjacent the holder.

U.S. Pat. No. 3,283,437 discloses a rod holder and alarm that utilizes an electric horn activated by an electric contact assembly that moves under impact of the fishing line during a strike closing a circuit activating the electric horn.

SUMMARY OF THE INVENTION

A fishing signal and rod holding device that prepositioned a fishing rod and reel for unattended fishing. A signaling device that is movably positioned by a fishing line from the rod and reel upon engagement with a fish. The signaling device is pulled off balance by the fishing line falling forward to strike a sound stop altering the fisherman of the presence of a fish on the respective line.

DESCRIPTION OF THE DRAWINGS

FIG. 1 is a front plan view of the fishing signaling and rod holder device;

FIG. 2 is an enlarged side plan view of a portion of the with a fishing rod and reel positioned within;

FIG. 3 is an enlarged partial perspective view of a signaling element of the invention; and FIG. 4 is a perspective view of the invention.

DESCRIPTION OF THE PREFERRED EMBODIMENT

Referring now to FIGS. 1,3, and 4 of the drawings a fishing rod and reel holder and signaling device 10 can be seen comprising a support frame 11 having a triangular base 12 with a vertically ascending support element 13 secured thereto. A removably secured horizontally disposed mounting bar 14 is on the free end of said support element 13 in spaced relation to said triangular base 12. A pair of oppositely disposed fishing rod and reel holders 15 are secured to the respective free ends of said mounting bar 14 and are comprised of tubular elements 16 and 17 having a respective closure 18 on one end thereof. Each of the tubular elements 16 and 17 has an attached angularly inclined engagement bracket 19 that is secured to and extends from said respective free ends of said mounting bar 14.

A pair of signaling devices 20 are positioned respectively adjacent each of said tubular elements 16 and 17 on the mounting bar 14. Each of said signaling devices is comprised of a movable upstanding element 21 having a hinge 22 at its proximal end secured to said mounting bar 14 and a line engagement pin 23 adjacent its distal end. A striker bracket 24 is secured to and extends outwardly from said mounting bar 14 in aligned oppositely disposed relation to said movable element 21 as best seen in FIGS. 2 and 3 of the drawings.

A line support rod 25 extends between and is secured respectively to said tubular element 16 and 17 adjacent their respective free ends. The line support rod 25 is required to align and support fishing line 26 from a fishing reel 27 on a fishing rod 28 during use as seen in FIGS. 2 and 3 of the drawings.

In use the fishing rod 28 has been positioned within the tubular element 17 and the fishing line 26 extends from the reel 27 over the line support rod 25 and around the engagement pin 23 then back over the line support rod 25 and on up the rod 28.

Upon a strike by a fish not shown the line 26 will be jerked pulling on the engagement pin 23 tipping over the upstanding hinged element 21 so that it falls by gravity against said striker bracket 24 creating a loud signal that indicates that fish has hit the line.

The rod 28 can then be removed from the tubular element 17 for use.

To reset said fishing signaling and rod holder device 10 the rod and reel 28 and 27 are returned to the tubular elements 16 and 17 respectively and the element 21 is reset to an upstanding position on the mounting bar 14. The fishing line 26 is re-engaged around the engagement pin 23 on the element 21 and is ready for the next strike.

Thus it will be seen that a new and useful fishing signaling device and rod holder has been illustrated and described and it will be apparent to those skilled in the art that various changes and modifications may be made thereto without departing from the spirit of the invention.

Therefore I claim:

1. A fishing signaling device comprising a support frame having a base, a support element extending from said base, a mounting bar removably secured to said support element in spaced relation to said base, at least one fishing rod and reel holder secured to said mounting bar, at least one signaling device adjacent said rod and reel holder, said signaling device comprises an upstanding element pivotally secured to said mounting bar, a striker bracket perpendicularly aligned with said upstanding element on said mounting bar, a line engagement means extending from said element in spaced relation to said mounting bar, means for aligning a fishing line from a fishing reel for engagement with said line engagement means.

2. The fishing signaling device of claim 1 wherein said rod and reel holder comprises an elongated tubular element having a closure on one end.

3. The fishing signaling device of claim 1 wherein said upstanding element is of known height and mass sufficient to engage said striker bracket.

4. The fishing signaling device of claim 1 wherein said line engagement means comprises an engagement pin extending from said upstanding element.

5. The fishing signaling device of claim 1 wherein said means for aligning a fishing line from a fishing rod and reel with said line engagement means comprises a line support rod extending from said rod and reel holder in spaced parallel relation to said mounting bar.

* * * * *